(12) United States Patent
Niki et al.

(10) Patent No.: US 8,738,230 B2
(45) Date of Patent: May 27, 2014

(54) STEERING CONTROL APPARATUS FOR VEHICLE

(75) Inventors: Keitaro Niki, Toyota (JP); Yoji Kunihiro, Nagoya (JP); Yoshiaki Suzuki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 266 days.

(21) Appl. No.: 13/139,730

(22) PCT Filed: Oct. 23, 2009

(86) PCT No.: PCT/JP2009/068730
§ 371 (c)(1),
(2), (4) Date: Jun. 15, 2011

(87) PCT Pub. No.: WO2010/082394
PCT Pub. Date: Jul. 22, 2010

(65) Prior Publication Data
US 2011/0257845 A1      Oct. 20, 2011

(30) Foreign Application Priority Data
Jan. 13, 2009   (JP) .................................... 2009-4376

(51) Int. Cl.
*B62D 6/00*              (2006.01)
(52) U.S. Cl.
USPC ................. 701/41; 701/42; 701/43; 180/443; 180/444
(58) Field of Classification Search
USPC ............... 701/41–43; 180/400, 410, 412, 443
See application file for complete search history.

(56) References Cited

U.S. PATENT DOCUMENTS 6,148,948 A * 11/2000 Shimizu et al. ............... 180/446
6,152,254 A * 11/2000 Phillips .......................... 180/422
(Continued)

FOREIGN PATENT DOCUMENTS

DE      10 2007 039 885      3/2008
EP         0 806 336 A2       11/1997
(Continued)

OTHER PUBLICATIONS

Design of control logic and compensation strategy for electric power steering systems; Tsung-Hsien Hu ; Chih-Jung Yeh ; Shih-Rung Ho ; Tsung-Hua Hsu ; Ming-Chih Lin; Vehicle Power and Propulsion Conference, 2008. VPPC '08. IEEE; Digital Object Identifier: 10.1109/VPPC.2008.4677471; Publication Year: 2008 , pp. 1-6.*

(Continued)

*Primary Examiner* — Cuong H Nguyen
(74) *Attorney, Agent, or Firm* — Finnegan, Henderson, Farabow, Garrett & Dunner, LLP (57) ABSTRACT

A coordinate-control-gain calculation section 61 calculates a coordinate-control final control torque T_C required to properly control the traveling behavior of a vehicle, and determines a coordinate control gain Kg on the basis of the magnitude of this torque T_C. An arbitration-request determination section 62 determines the value of an arbitration request flag FRG_A on the basis of the magnitude of the torque T_C and the value of a flag FRG_L output so as to properly control the traveling behavior of a vehicle. On the basis of the value of the flag FRG_A and the magnitude of the coordinate-control arbitration torque Tr determined by use of the gain Kg, an arbitration section 63 selects the torque T_C or the torque Tr to be output as a post-arbitration control torque T_F. A post-arbitration drive control section 64 supplies to an electric motor a drive current corresponding to the determined torque T_F.

8 Claims, 6 Drawing Sheets

(56) References Cited

U.S. PATENT DOCUMENTS

| | | | |
|---|---|---|---|
| 6,360,151 B1 * | 3/2002 | Suzuki et al. | 701/41 |
| 6,499,559 B2 * | 12/2002 | McCann et al. | 180/446 |
| 6,751,538 B2 * | 6/2004 | Endo | 701/41 |
| 7,117,076 B2 * | 10/2006 | Shimakage et al. | 701/41 |
| 7,860,624 B2 * | 12/2010 | Kubota et al. | 701/41 |
| 7,885,730 B2 * | 2/2011 | Kaufmann et al. | 701/1 |
| 2001/0041957 A1 * | 11/2001 | McCann et al. | 701/41 |
| 2002/0056587 A1 * | 5/2002 | Shibasaki et al. | 180/443 |
| 2003/0069676 A1 * | 4/2003 | Kanda | 701/41 |
| 2003/0120404 A1 * | 6/2003 | Endo | 701/41 |
| 2004/0206571 A1 * | 10/2004 | Nishizaki et al. | 180/446 |
| 2006/0069481 A1 * | 3/2006 | Kubota et al. | 701/41 |
| 2007/0205041 A1 * | 9/2007 | Nishizaki et al. | 180/446 |
| 2008/0047775 A1 | 2/2008 | Yamazaki | |

FOREIGN PATENT DOCUMENTS

| | | | |
|---|---|---|---|
| EP | 1 698 539 A1 | | 9/2006 |
| EP | 1 700 774 A2 | | 9/2006 |
| EP | 1246746 B1 | * | 2/2010 |
| JP | 6-206564 | | 7/1994 |
| JP | 9-085012 | * | 4/1997 |
| JP | 11-296176 | * | 10/1999 |
| JP | 2003534180 W | * | 11/2003 |
| JP | 2006-224750 | | 8/2006 |
| JP | PCT/JP05/08428 | * | 3/2007 |
| WO | WO 0147762 A1 | * | 7/2001 |
| WO | WO01/89911 | * | 11/2001 |

OTHER PUBLICATIONS

Adaptive open-loop rear-wheel-steering; Shin, K.-k. ; Shih-Ken Chen; American Control Conference, 2005. Proceedings of the 2005 Digital Object Identifier: 10.1109/ACC.2005.1470293; Publication Year: 2005 , pp. 2187-2193 vol. 3 an IEEE Conference Publication.*

The robust self-regulating control of the vehicle steering system; Li Guo ; Peng Sha ; Tang Shihui; Mechatronic Science, Electric Engineering and Computer (MEC), 2011 International Conference on; Digital Object Identifier: 10.1109/MEC.2011.6025893 Publication Year: 2011 , pp. 2046-2049; an IEEE Conference Publication.*

International Search Report in International Application No. PCT/JP2009/068730; Mailing Date: Feb. 8, 2010.

Written Opinion of the International Searching Authority in International Application No. PCT/JP2009/068730; Mailing Date: Feb. 8, 2010.

* cited by examiner

STEERING CONTROL APPARATUS FOR VEHICLE

CROSS-REFERENCE TO RELATED APPLICATIONS

This application is a national phase application of International Application No. PCT/JP2009/068730, filed Oct. 23, 2009, and claims the priority of Japanese Application No. 2009-4376, filed Jan. 13, 2009, the contents of both of which are incorporated herein by reference.

TECHNICAL FIELD

The present invention relates to a steering control apparatus for a vehicle (hereinafter, may be referred to as a "vehicular steering control apparatus") which includes a steering wheel operated by a driver, force providing means for providing a predetermined force for the operation of the steering wheel, and operation control means for controlling the operation of the force providing means.

BACKGROUND ART

Conventionally, there has been known a vehicular steering apparatus disclosed in Japanese Patent Application Laid-Open (kokai) No. 2006-224750. This conventional vehicular steering apparatus includes a lane-keeping-assist control section which detects a lane of a road on which a vehicle travels and automatically controls the steering of the vehicle so as to cause the vehicle to travel along the lane; and a yaw-rate-reaction-force control section which controls the steering reaction in accordance with the yaw rate of the vehicle. When the vehicular steering apparatus switches its operation mode from a normal control mode in which the yaw-rate-reaction-force control section is operated to a lane-keeping-assist control mode in which the lane-keeping-assist control section is operated, the vehicular steering apparatus switches its operation mode via a transition mode in order not to impart an unnatural steering sensation to a driver. In this transition mode, the vehicular steering apparatus gradually reduces, with elapse of time, a yaw-rate-reaction-force target current output from the yaw-rate reaction force control section, and gradually increases, with elapse of time, a lane-keeping-assist target current output from the lane-keeping-assist control section.

Further, there has been conventionally known a vehicular steering apparatus disclosed in Japanese Patent Application Laid-Open (koka!) No. H6-206564. This conventional vehicular steering apparatus includes control changeover means for mitigating a shock which is generated in the vehicle when its operation is switched between a state feedback control for controlling a yaw rate generated in the vehicle when the front wheels are steered such that the yaw rate coincides with a target value and another, second control. This control changeover means restricts, to a smaller value, the maximum value of change in the controlled variable when the control is switched.

DISCLOSURE OF THE INVENTION

Incidentally, in the above-described conventional apparatuses, when the operation or control mode is switched, instantaneous switching or switching accompanied by a large change in the controlled variable is avoided so as not to impart unnatural sensation to a driver. However, when the force provided for the operation of the steering wheel is switched, a time is required to reduce a steering reaction produced by the control employed before the switching (as in the apparatus disclosed in Japanese Patent Application Laid-Open No. 2006-224750) or reduce the steering reaction force while restricting the maximum value of change in the steering reaction force (as in the apparatus disclosed in Japanese Patent Application Laid-Open No. H6-206564). Therefore, the control which is executed after the switching involves a time delay, so that the conventional apparatuses may fail to provide a force for the operation of the steering wheel at proper timing. Therefore, in the case where a force is provided for the operation of the steering wheel through switching of the control mode, there has been a desire not only to prevent impartation of unnatural feel to a driver but also to enable quick switching of the control mode.

The present invention has been accomplished so as to solve the above-described problem, and its object is to provide a vehicular steering control apparatus which can quickly switch the force provided for the operation of the steering wheel without imparting unnatural sensation to a driver.

In order to accomplish the above-described object, the present invention provides a steering control apparatus for a vehicle which includes a steering wheel operated by a driver, force providing means for providing a predetermined force for the operation of the steering wheel, and operation control means for controlling the operation of the force providing means. The operation control means comprises first-controlled-variable input means for inputting a first controlled variable output from an apparatus which controls a traveling behavior of the vehicle, the first controlled variable being used to provide a first force for the operation of the steering wheel so as to correct the traveling behavior of the vehicle; second-controlled-variable calculation means for calculating a second controlled variable used to provide a second force for the operation of the steering wheel so as to reduce an operating force applied to the steering wheel by the driver or resist against the operating force; gain calculation means for calculating a gain which decreases as the first controlled variable input by the first-controlled-variable input means increases and increases as the input first controlled variable decreases, the gain changing the magnitude of the second controlled variable calculated by the second-controlled-variable calculation means; arbitration means for prohibiting output of the second controlled variable changed in accordance with the gain and permitting output of the first controlled variable when the magnitude of the second controlled variable which is decreasing in accordance with the gain calculated by the gain calculation means becomes smaller than a preset predetermined permission value, and for permitting the output of the second controlled variable changed in accordance with the gain and prohibiting the output of the first controlled variable when the magnitude of the second controlled variable which is increasing in accordance with the gain is smaller than the predetermined permission value; and operation means for operating the force providing means by use of the first controlled variable or the second controlled variable changed in accordance with the gain, the output of which is permitted by the arbitration means.

In this case, preferably, the magnitude of the second controlled variable is changed by being multiplied by the gain calculated by the gain calculation means.

Further, preferably, the operation control means further comprises arbitration determination means for comparing the magnitude of the first controlled variable input by the first-controlled-variable input means and a preset predetermined determination value, and determining that arbitration for giving priority to the output of the first controlled variable over the output of the second controlled variable changed in accordance with the calculated gain is necessary when the magnitude of the first controlled variable is greater than the predetermined determination value, wherein the arbitration means prohibits the output of the second controlled variable changed in accordance with the gain and permits the output of the first controlled variable when the arbitration determination means determines that the arbitration is necessary and the magnitude of the second controlled variable which is decreasing in accordance with the gain is smaller than a preset predetermined permission value, and the arbitration means permits the output of the second controlled variable changed in accordance with the gain and prohibits the output of the first controlled variable when the arbitration determination means determines that the arbitration is unnecessary and the magnitude of the second controlled variable which is increasing in accordance with the gain is smaller than the permission value.

In this case, preferably, the apparatus for controlling the traveling behavior of the vehicle outputs the first controlled variable and a request information piece which requests the output of the first controlled variable; and the arbitration determination means determines that arbitration for giving priority to the output of the first controlled variable over the output of the second controlled variable changed in accordance with the gain is necessary when the magnitude of the first controlled variable input by the first-controlled-variable input means is greater than the predetermined determination value or when the request information piece is input by the first-controlled-variable input means.

Further, preferably, the apparatus for controlling the traveling behavior of the vehicle is at least one of a behavior control apparatus which corrects a disorder of behavior generated, for example, as a result of braking or driving the vehicle to thereby stabilize the traveling posture of the vehicle and a lane-keeping assist apparatus which assists the operation of the steering wheel by the driver in order to cause the vehicle to travel while following the shape of a portion of a road located ahead of the vehicle.

In this case, preferably, the first controlled variable is the sum of a controlled variable which is output from the behavior control apparatus and is used to provide a force for the operation of the steering wheel in order to correct the disorder of behavior generated in the vehicle, and a controlled variable which is output from the lane-keeping assist apparatus and is used to provide a force for the operation of the steering wheel in order to assist the operation of the steering wheel.

Moreover, preferably, the second-controlled-variable calculation means calculates a second controlled variable used to provide the second force for the operation of the steering wheel in order to prevent a vibration of the steering wheel in the operation direction and a vibration of yawing generated in the vehicle from becoming antiphase with each other and resonating.

In this case, preferably, the second-controlled-variable calculation means calculates a second controlled variable used to provide the second force for the operation of the steering wheel in order to reduce a phase difference between a change in the operation amount of the steering wheel and a change in the force provided to the steering wheel by the force providing means.

By virtue of these configurations, the operation control means can prevent the first force and the second force from interfering with each other, even in the case where two states occur simultaneously; i.e., a state in which, on the basis of the first controlled variable output from the apparatus which controls the traveling behavior of the vehicle (e.g., the behavior control apparatus, the lane-keeping assist apparatus, or the like), the first force is provided for the operation of the steering wheel in order to correct the traveling behavior of the vehicle; and a state in which, on the basis of the calculated second controlled variable, the second force is provided in order to reduce the operating force applied to the steering wheel by the driver or resist against the operating force. Specifically, the operation control means calculates a gain which decreases as the magnitude of the first controlled variable increases, and increases as the magnitude of the first controlled variable decreases. Thus, the operation control means can quickly changes the magnitude of the second controlled variable, which is changed by use of the calculated gain (for example, by being multiplied by the gain) such that the change in the magnitude of the second controlled variable matches the change in the magnitude of the first controlled variable.

By virtue of the above-described operation, in a state in which the magnitude of the first controlled variable increases, the magnitude of the second controlled variable, which is changed in accordance with the decreasing gain, can be decreased quickly. Therefore, the first force based on the first controlled variable can be preferentially provided for the operation of the steering wheel. Meanwhile, in a state in which the magnitude of the first controlled variable decreases, the magnitude of the second controlled variable, which is changed in accordance with the increasing gain, can be increased quickly. Therefore, the second force based on the second controlled variable changed in accordance with the gain can be preferentially provided for the operation of the steering wheel. Accordingly, use of such gain enables the change in the magnitude of the second controlled variable to match the change in the magnitude of the first controlled variable, whereby the force provided for the operation of the steering wheel can be switched without time delay and without causing interference.

Further, in this case, by means of taking notice of the magnitude of the second controlled variable changed in accordance with the gain and the trend of change in the magnitude thereof (decreasing trend or increasing trend), it becomes possible to prohibit or permit the output of the second controlled variable changed in accordance with the gain; i.e., it becomes possible to permit or prohibit the output of the first controlled variable, when the second controlled variable changed in accordance with the gain is smaller than the predetermined permission value. By virtue of this control, the driver becomes less likely to sense an unnatural sensation via the steering wheel due to a change in force, which change would otherwise occur upon switching from the state in which the second controlled variable changed in accordance with the gain is output to the state in which the first controlled variable is output, or upon switching from the state in which the first controlled variable is output to the state in which the second controlled variable changed in accordance with the gain is output.

Further, in the case where the magnitude of the first controlled variable is greater than the present determination value; i.e., in the case where the first force must be provided for the rotating operation of the steering wheel in order to correct the traveling behavior of the vehicle, the operation control means can determine that arbitration for giving priority to the output of the first controlled variable over the output of the second controlled variable changed in accordance with the gain is necessary in order to effectively prevent interference between the first controlled variable and the second controlled variable changed in accordance with the gain. In the case where the magnitude of the second controlled variable changed in accordance with the gain is smaller than the predetermined permission value, the operation control means can permit the output of the first controlled variable instead of the output of the changed second controlled variable when it determines that arbitration is necessary and can permit the output of the changed second controlled variable instead of the output of the first controlled variable when it determines that arbitration is unnecessary. By virtue of this operation, the operation control means can preferentially output the first controlled variable while reliably preventing interference between the first controlled variable and the second controlled variable changed in accordance with the gain.

In this case, in the case where a request information piece which requests the output of the first controlled variable is output together with the first controlled variable, the necessity of arbitration can be determined by use of this request information piece as well. As described above, through use of the request information piece, the operation control means can preferentially output the first controlled variable while more reliably preventing interference between the first controlled variable and the second controlled variable changed in accordance with the gain.

BEST MODE FOR CARRYING OUT THE INVENTION

Figure 1:
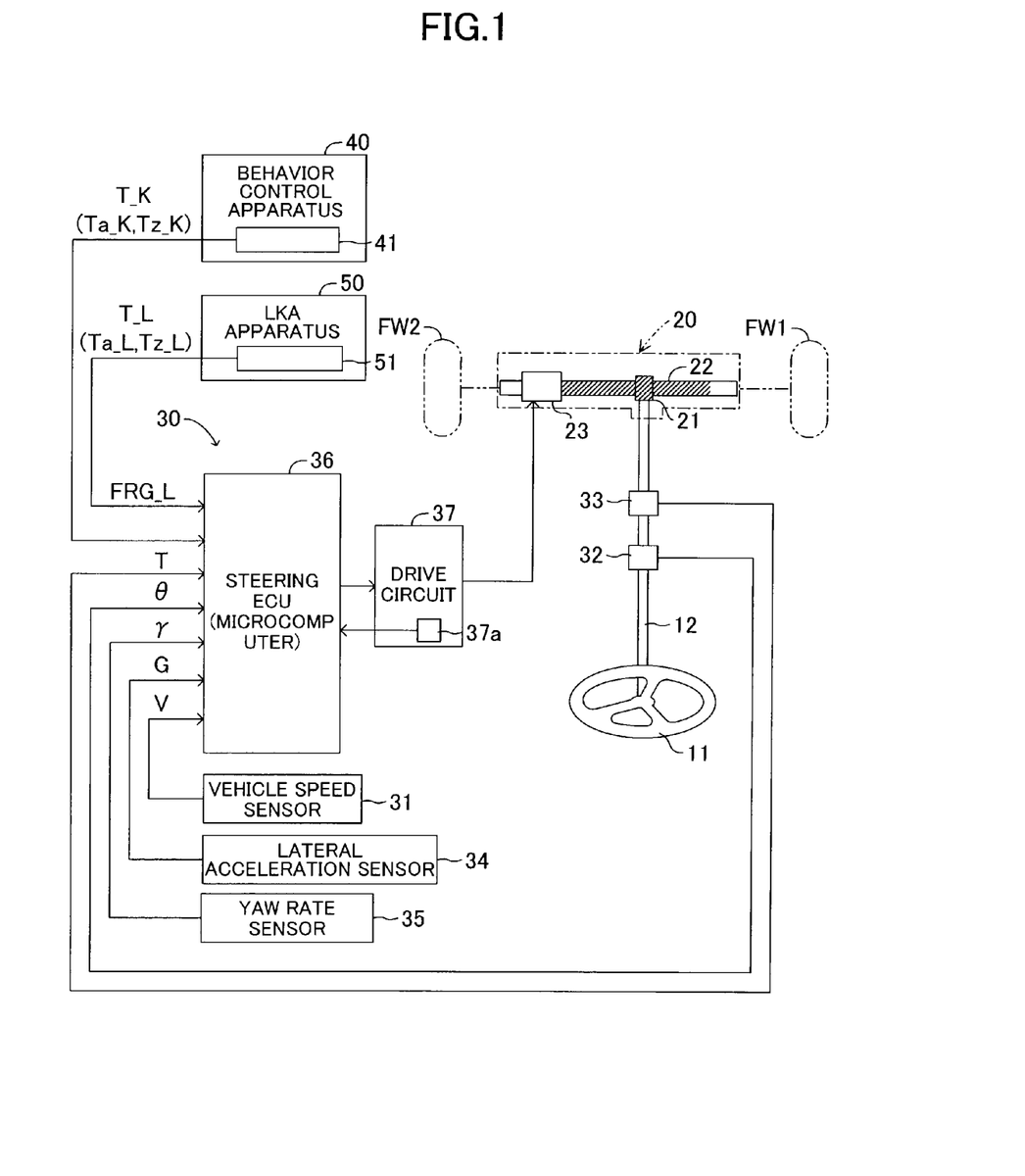
FIG. 1 is a schematic diagram of an electric power steering apparatus to which a steering control apparatus according to an embodiment of the present invention is applied.

A steering control apparatus according to an embodiment of the present invention will now be described with reference to the drawings. FIG. 1 schematically shows an electric power steering apparatus to which the steering control apparatus according to the present embodiment is applied.

This electric power steering apparatus has a steering wheel 11 which is rotated by a driver so as to steer left and right front wheels FW1 and FW2, which are steerable wheels. This steering wheel 11 is fixed to the upper end of a steering shaft 12, and the lower end of the steering shaft 12 is connected to a steering gear unit 20.

The steering gear unit 20 is a gear unit which employs, for example, a rack and pinion mechanism and which is designed such that rotation of a pinion gear 21 integrally assembled to the lower end of the steering shaft 12 is transmitted to a rack bar 22. Further, the steering gear unit 20 includes an electric motor 23 which generates a torque for reducing a steering torque T which is input by a driver by means of rotating the steering wheel 11 (hereinafter, this torque will be referred to as "assist torque Ta") and also generates a torque approximately equal to the steering torque T in a direction opposite the direction of the steering torque T (hereinafter, this torque will be referred to as "reaction torque Tz"). Notably, in the following description, the electric motor 23 will be referred to as an "EPS motor 23." This EPS motor 23 is assembled such that it can transmit the generated assist torque Ta or reaction torque Tz to the rack bar 22.

By virtue of this configuration, the steering torque T input from the steering wheel 11 to the steering shaft 12 is transmitted to the rack bar 22 via the pinion gear 21, and the assist torque Ta or reaction torque Tz generated by the EPS motor 23 is transmitted to the rack bar 22. The rack bar 22 moves along an axial direction in accordance with the transmitted torques, whereby the left and right front wheels FW1 and FW2, which are connected to opposite ends of the rack bar 22, are steered leftward or rightward.

Next, an electric control apparatus 30 which controls operation of the EPS motor 23 will be described. The electric control apparatus 30 includes a vehicle speed sensor 31, a steering angle sensor 32, a steering torque sensor 33, a lateral acceleration sensor 34, and a yaw rate sensor 35.

The vehicle speed sensor 31 detects speed V of the vehicle and outputs a signal representing the detected vehicle speed V. The steering angle sensor 32, which is assembled to the steering shaft 12, detects the amount of rotation of the steering wheel 11; i.e., the amount of rotation of the steering shaft 12, and outputs a signal representing the detected rotational amount as steering angle θ. Notably, when the steering wheel 11 is located at its neutral position, the steering angle θ is "0." The steering angle θ assumes a positive value when the steering wheel 11 is rotated counterclockwise from the neutral position, and assumes a negative value when the steering wheel 11 is rotated clockwise from the neutral position. The steering torque sensor 33, which is assembled to the steering shaft 12, detects the steering torque T applied to the shaft 12, and outputs a signal representing the detected steering torque T. When the steering shaft 12 is located at its neutral position, the steering torque T is "0." The steering torque T assumes a positive value when a torque is applied to the steering shaft 12 in the counterclockwise direction with respect to the heading direction of the vehicle, and assumes a negative value when a torque is applied to the steering shaft 12 in the clockwise direction with respect to the heading direction of the vehicle.

The lateral acceleration sensor 34 detects lateral acceleration G of the vehicle and outputs a signal representing the detected lateral acceleration G. The yaw rate sensor 35 detects yaw rate γ of the vehicle and outputs a signal representing the detected yaw rate γ. Each of the lateral acceleration G and the yaw rate γ assumes a positive value when a leftward acceleration or yaw rate is generated with respect to the heading direction of the vehicle, and assumes a negative value when a rightward acceleration or yaw rate is generated with respect to the heading direction of the vehicle.

These sensors 31 to 35 are connected to a steering electronic control unit 36 (hereinafter simply referred to as the "steering ECU 36"). The steering ECU 36 is mainly composed of a microcomputer including a CPU, ROM, RAM, etc. The steering ECU 36 controls operation of the EPS motor 23 through execution of programs to thereby generate the assist torque Ta or the reaction torque Tz. In order to control the EPS motor 23, a drive circuit 37 for driving the EPS motor 23 is connected to the output side of the steering ECU 36. The drive circuit 37 includes a current detector 37a for detecting drive current flowing through the EPS motor 23. The drive current detected by the current detector 37a is fed back to the steering ECU 36 so as to control the drive of the EPS motor 23.

As apparatuses for properly controlling the traveling behavior of the vehicle, a behavior control apparatus 40 and a lane-keeping assist apparatus 50 (hereinafter, simply referred to as an "LKA apparatus 50") are connected to the electric control apparatus 30 (more specifically, the steering ECU 36) via predetermined communication lines. Notably, a driver can activate and deactivate the behavior control apparatus 40 and the LKA apparatus 50 by operating unillustrated changeover switches. Since the specific operations of these apparatuses 40 and 50 do not relate directly to the present invention, their configurations will be described briefly.

The behavior control apparatus 40 executes coordinate control adapted to operate, in a coordinated manner, an unillustrated engine, brake apparatus, etc., mounted on the vehicle, so as to properly correct a disorder of behavior generated through braking or driving of the vehicle during travel, to thereby stabilize the traveling posture of the vehicle. In order to perform such coordinate control, the behavior control apparatus 40 includes an electronic control unit 41, which is mainly composed of a microcomputer including a CPU, ROM, RAM, etc. The electronic control unit 41 calculates a target yaw rate γd to be generated by the vehicle in a traveling state, by use of an actual steering angle θ detected by, for example, the steering angle sensor 32, and compares the calculated target yaw rate γd and an actual yaw rate γ detected by the yaw rate sensor 35. On the basis of the result of the comparison, the electronic control unit 41 controls, in a coordinated manner, operations of an actuator (throttle actuator) for adjusting the output of the engine and an actuator (brake actuator) for adjusting the braking force of a brake apparatus such that the actual yaw rate γ coincides with the target yaw rate γd.

In addition to controlling the operations of these actuators in a coordinated manner, the electronic control unit 41 calculates steering amounts of the left and right front wheels FW1 and FW2; i.e., an amount by which the steering wheel 11 is to be rotated by the driver (target steering angle θd), required to render the actual yaw rate γ coincident with the target yaw rate γd. The electronic control unit 41 then compares the calculated target steering angle θd and the actual steering angle θ detected by the steering angle sensor 32. On the basis of the result of the comparison, the electronic control unit 41 calculates the assist torque Ta or the reaction torque Tz which the EPS motor 23 must provide for the rotating operation of the steering wheel 11 such that the actual steering angle θ coincides with the target steering angle θd (in the following description, these torques will be referred to as an "assist torque Ta_K" and a "reaction torque Tz_K," respectively). The electronic control unit 41 requests the steering ECU 36 to output the calculated assist torque Ta_K or reaction torque Tz_K. In the following description, the assist torque Ta_K and the reaction torque Tz_K, output of which is requested by the electronic control unit 41 upon execution of the coordinate control may be collectively referred to as a "coordinate control torque T_K."

The LKA apparatus 50 determines the shape of a portion of the road located ahead of the vehicle, and executes assist control adapted to assist the rotating operation of the steering wheel 11 by the driver such that the vehicle can properly travel while following the road shape. In order to perform such assist control, the LKA apparatus 50 includes an electronic control unit 51, which is mainly composed of a microcomputer including a CPU, ROM, RAM, etc. This electronic control unit 51 acquires information regarding the shape of the road portion located ahead of the vehicle from, for example, an unillustrated navigation apparatus mounted on the vehicle. Further, the electronic control unit 51 acquires, from an unillustrated image processing apparatus mounted on the vehicle and equipped with a camera photographing the surroundings of the vehicle, information regarding the width of a lane, the lateral position of the vehicle in relation to the center of the lane, and the yaw angle of the camera in relation to the lane, the pitch angle of the camera, which are obtained through, for example, image processing.

The electronic control unit 51 determines the shape of the road portion located ahead of the vehicle by making use of these acquired pieces of information, and determines whether or not the vehicle travels while following the road shape; for example, whether or not the vehicle travels along the center of the lane. When the result of this determination indicates that the vehicle is approaching an edge of the lane, the electronic control unit 51 urges the driver to rotate the steering wheel 11 such that the vehicle returns to the center of the lane. At that time, the electronic control unit 51 calculates an assist torque Ta or a reaction torque Tz (in the following description, these torques will be referred to as an "assist torque Ta_L" and a "reaction torque Tz_L," respectively), which the EPS motor 23 must provide so as to assist the driver in rotating the steering wheel 11.

The electronic control unit 51 requests the steering ECU 36 to output the calculated assist torque Ta_L or reaction torque Tz_L. Notably, in the following description, the assist torque Ta_L and the reaction torque Tz_L, output of which is requested by the electronic control unit 51 upon execution of the assist control, may be collectively referred to as an "assist control torque T_L." When the electronic control unit 51 requests output of the assist control torque T_L, the electronic control unit 51 outputs a steering assist request flag FRG_L to the steering ECU 36, as will be described in detail later.

Next, operation of the embodiment configured as described above will be described. As described above, the steering ECU 36 can generate the assist torque Ta or the reaction torque Tz so as to assist the rotating operation of the steering wheel 11 by the driver through control of the drive of the EPS motor 23. First, there will be specifically described normal control which is executed by the steering ECU 36 in an ordinary state so as to cause the EPS motor 23 to generate the assist torque Ta.

When the steering wheel 11 is rotated by the driver, the steering ECU 36 calculates a target assist torque Tad so as to reduce the burden associated with this rotating operation. That is, in order to calculate the target assist torque Tad, the steering ECU 36 receives the detected vehicle speed V from the vehicle speed sensor 31, and receives the detected steering torque T from the steering torque sensor 33.

Figure 2:
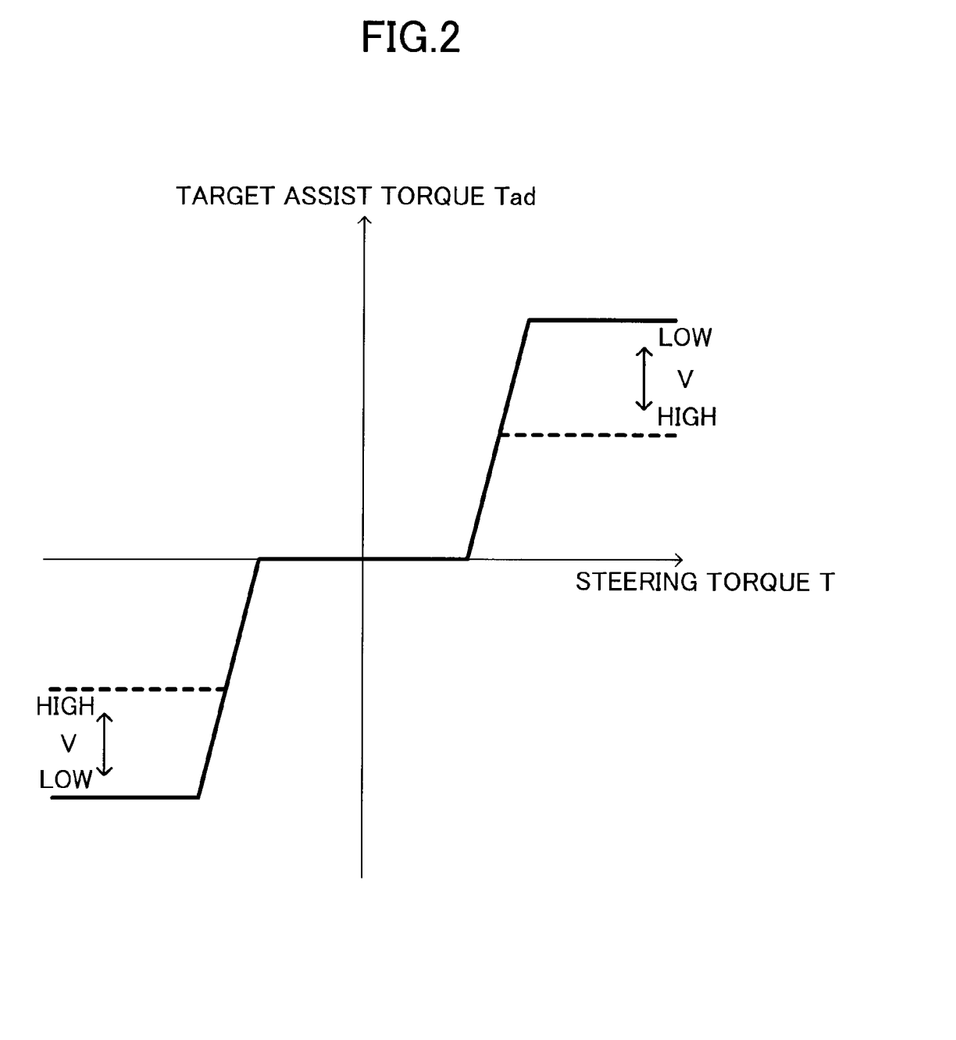
FIG. 2 is a graph showing the relation between steering torque T and target assist torque Tad.

Next, the steering ECU 36 determines the target assist torque Tad by reference to a characteristic map which represents change in the target assist torque Tad with the detected steering torque T as shown in FIG. 2. The target assist torque Tad has a changing characteristic such that the target assist torque Tad is "0" when the absolute value of the detected steering torque T is relatively small, whereby a play of the steering wheel 11 is secured; increases with the absolute value of the detected steering torque T; and assumes a constant value when the absolute value of the detected steering torque T becomes greater than a predetermined value. Further, as shown in FIG. 2, the target assist torque Tad has a changing characteristic such that the target assist torque Tad decreases as the detected vehicle speed V increases, and increases as the detected vehicle speed V decreases. The steering ECU 36 determines a target assist torque Tad corresponding to the detected steering torque T by reference to the characteristic map.

After determining the target assist torque Tad as described above, the steering ECU 36 supplies to the EPS motor 23, via the drive circuit 37, a drive current previously set to correspond to the determined target assist torque Tad. At that time, the steering ECU 36 receives from the current detector 37a a signal representing the drive current flowing to the EPS motor 23, and feedback-controls the drive circuit 37 such that the magnitude of the drive current flowing to the EPS motor 23 becomes equal to the target assist torque Tad. By virtue of the control of drive of the EPS motor 23, the motor 23 generates an assist torque Ta equal to the target assist torque Tad, and the generated assist torque Ta is transmitted to the steering wheel 11. As a result, the driver can rotate the steering wheel 11 quite easily with a small steering torque T.

Incidentally, when the driver excessively rotates the steering wheel 11 in a steering direction, the vehicle turns (yaws) by an amount greater than intended. In such a case, the driver tries to suppress the generated excessive yawing motion of the vehicle by rotating the excessively rotated steering wheel 11 toward the neural position; i.e., in a steering back direction.

When the rotating operation in the steering direction and that in the steering back direction are repeated, a phase difference is produced between a change in the steering angle θ of the steering wheel 11 and a change in the steering torque T, and the steering wheel 11 starts to vibrate in the rotating direction. If the vibration of the steering wheel 11 in the rotating direction and the vibration of the yawing generated in the vehicle become antiphase with each other and resonate (so-called coupling), the vehicle meanders. Therefore, in a state in which the driver's rotating operation causes the steering wheel 11 to vibrate in the rotating direction; that is, in a state in which the driver's rotating operation causes the steering wheel 11 to overshoot, the steering ECU 36 calculates a target converging assist torque Tas which converges the vibration of the steering wheel 11. Control for calculating the target converging assist torque Tas and driving the EPS motor 23 (hereinafter, this control will be referred to as "coupling compensation control") will now be described specifically.

In this coupling compensation control, for calculation of the target converging assist torque Tas, the steering ECU 36 first sets vehicle-speed dependent coefficients Kv1 and Kv2, which change depending on the vehicle speed V detected by the vehicle speed sensor 31. The vehicle-speed dependent coefficients Kv1 and Kv2 can be obtained by use of an equation of motion representing a motion of a vehicle in a plane.

Specifically, the equation of motion of a vehicle is generally represented by the following Eqs. 1 to 4.

$$I \cdot \gamma' = Ff \cdot Lf - Fr \cdot Lr \qquad \text{Eq. 1}$$

$$m \cdot V \cdot (\beta' + \gamma) = Ff + Fr \qquad \text{Eq. 2}$$

$$Ff = 2 \cdot Kf \cdot (\delta - \beta - Lf \gamma / V) \qquad \text{Eq. 3}$$

$$Fr = 2 \cdot Kr \cdot (-\beta - Lr - \gamma / V) \qquad \text{Eq. 4}$$

In Eqs. 1 to 4, I represents the moment of inertia of the vehicle, Lf represents the distance between the shaft of the left and right front wheels FW and FW2 and the centroid of the vehicle, Lr represents the distance between the shaft of unillustrated rear wheels and the centroid of the vehicle, Lt represents a trail, β represents a slip angle of the vehicle, Kf represents a cornering power of the left and right front wheels FW1 and FW2, Kr represents a cornering power of the rear wheels, Ff represents a lateral force of the left and right front wheels FW1 and FW2, and Fr represents a lateral force of the rear wheels. Notably, γ' in Eq. 1 represents the first-order differential value of the yaw rate γ, m in Eq. 2 represents the mass of the vehicle, and δ in Eqs. 3 and 4 represents a steered angle of the left and right front wheels FW1 and FW2.

Further, in general, the driver applies a torque to the steering shaft 12 via the steering wheel 11. Therefore, the following Eq. 5 stands.

$$Ih\delta'' + Ch \cdot \delta' + Ff \cdot Lt = Th \qquad \text{Eq. 5}$$

In Eq. 5, Ih represents the moment of inertia of the left and right front wheels FW1 and FW2, Ch represents a coefficient of viscosity, and Th represents the input torque. Notably, δ" in Eq. 5 represents a second-order differential value of the steered angle of the left and right front wheels FW1 and FW2, and δ' represents a first-order differential value of the steered angle of the left and right front wheels FW1 and FW2.

In the case where the value of the right side of Eq. 5 is obtained as the target converging assist torque Tas by use of Eqs. 1 to 5 with greater importance placed on suppression of the vibration of the yawing generated in the vehicle, the target converging assist torque Tas can be obtained or set on the basis of the lateral force Fr of the rear wheels and the differential value dFr of the lateral force Fr of the rear wheels. Specifically, the target converging assist torque Tas is set to the sum of a value obtained by multiplying the lateral force Fr of the rear wheels by a coefficient A and a value obtained by multiplying the differential value dFr of the lateral force Fr of the rear wheels by a coefficient B. Since these coefficients A and B correspond to the vehicle-speed dependent coefficient Kv1 and the vehicle-speed dependent coefficient Kv2, respectively, the target converging assist torque Tas can be represented by the following Eq. 6.

$$Tas = Kv1 \cdot Fr + Kv2 \cdot dFr \qquad \text{Eq. 6}$$

Figure 3:
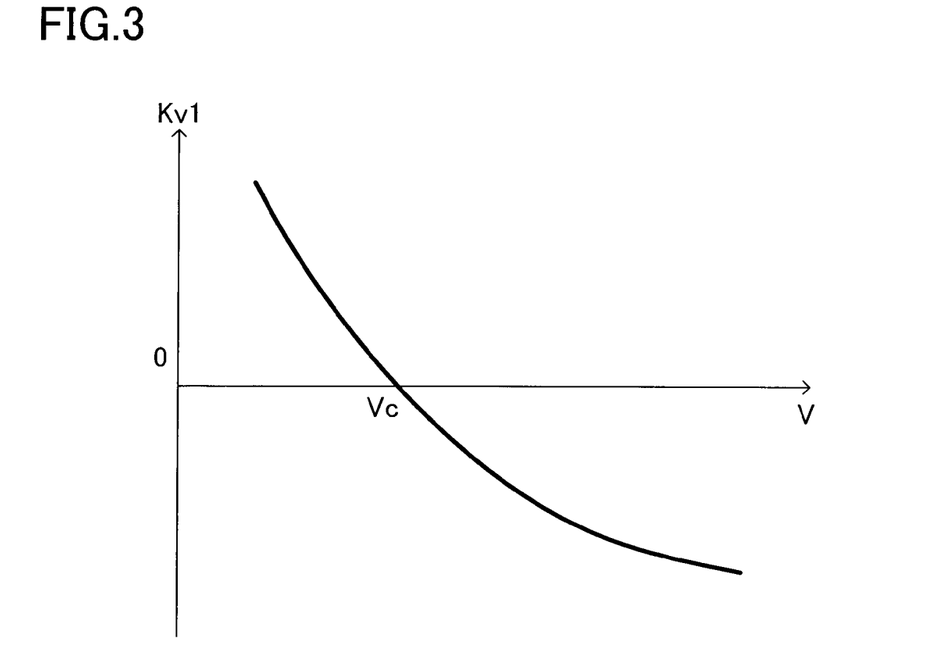
FIG. 3 is a graph showing the relation between vehicle speed V and vehicle-speed dependent coefficient Kv1.
Figure 4:
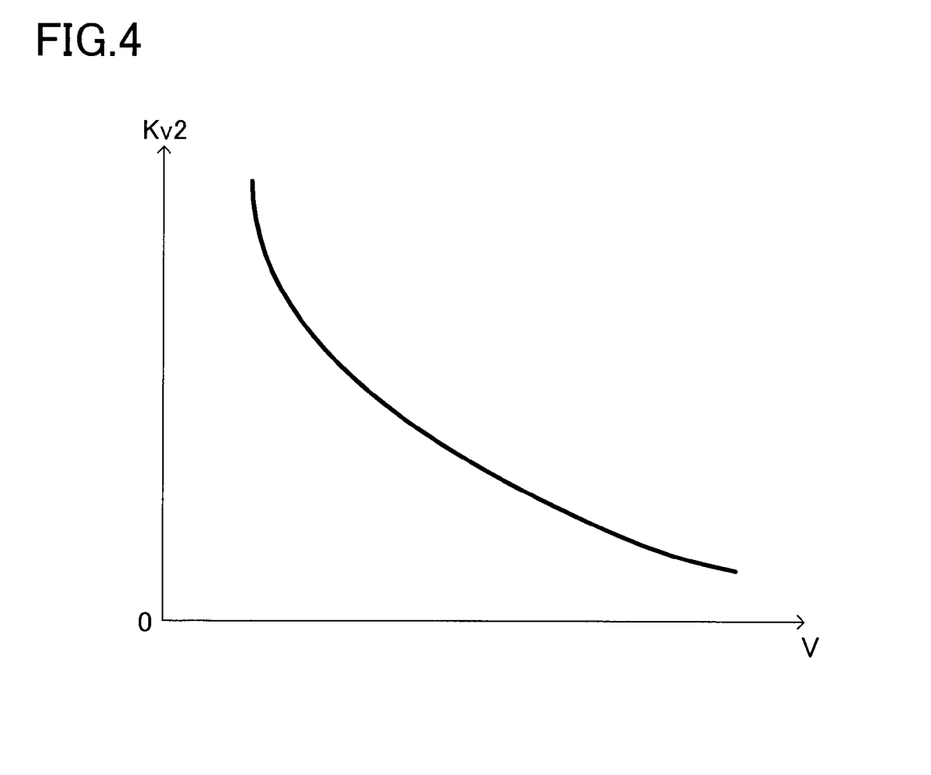
FIG. 4 is a graph showing the relation between vehicle speed V and vehicle-speed dependent coefficient Kv2.

The vehicle-speed dependent coefficient Kv1 and the vehicle-speed dependent coefficient Kv2, which are obtained in this manner, have changing characteristics such that they change with the vehicle speed V, as shown in FIGS. 3 and 4. In particular, as shown in FIG. 3, the vehicle-speed dependent coefficient Kv1 reverses its sign or polarity at a vehicle speed Vc at which the vehicle is neutrally steered. Specifically, the vehicle-speed dependent coefficient Kv1 assumes a positive value when the vehicle speed is lower than the vehicle speed Vc, and assumes a negative value when the vehicle speed is equal to or higher than the vehicle speed Vc. This shows that, at a vehicle speed equal to or higher than the vehicle speed Vc, since the vehicle tends to be over-steered, in order to mitigate the tendency of being over-steered; i.e., in order to suppress the vibration of the yawing generated in the vehicle, the target converging assist torque Tas (reaction torque Tz) is set such that it is applied in a direction opposite the direction in which the steering wheel 11 is rotated by the driver. That is, it shows that the target converging assist torque Tas is set to such a value as to restrain the driver's rotating operation of the steering wheel 11 to thereby stabilize the behavior of the vehicle.

As described above, the target converging assist torque Tas can be calculated by the above-described Eq. 6. However, depending on the behavior of the vehicle, direct use of the target converging assist torque Tas calculated in accordance with Eq. 6 may deteriorate the behavior of the vehicle. Therefore, in the present embodiment, the target converging assist torque Tas is calculated in consideration of the following factors.

Specifically, there are taken into consideration a longitudinal acceleration coefficient Ka, which changes in accordance with the magnitude of an acceleration generated in the front-rear direction (longitudinal direction) of the vehicle, a bad road coefficient Kb, which changes depending on whether or not the vehicle travels on a bad road (e.g., a road of low friction coefficient, a bumpy road, or the like), and a suspension coefficient Kc, which changes as a result of alteration of the damping force of a suspension apparatus of the vehicle. Thus, the vibration of the yawing generated in the vehicle can be suppressed, without deteriorating the behavior of the vehicle, by means of calculating the target converging assist torque Tas by use of a coefficient K1, which is obtained by multiplying the vehicle-speed dependent coefficient Kv1 by the longitudinal acceleration coefficient Ka, the bad road coefficient Kb, the suspension coefficient Kc, etc. That is, in this case, the target converging assist torque Tas is calculated on the basis of the above-described Eq. 6 and in accordance with the following Eq. 7.

$$Tas = K1 \cdot Fr + Kv2 \cdot dFr \qquad \text{Eq. 7.}$$

Upon completion of calculation of the target converging assist torque Tas in accordance with Eq. 7, the steering ECU 36 supplies to the EPS motor 23, via the drive circuit 37, a drive current previously set to correspond to the calculated target converging assist torque Tas. At that time, the steering ECU 36 receives from the current detector 37a a signal representing the drive current flowing to the EPS motor 23, and feedback-controls the drive circuit 37 such that the magnitude of the drive current flowing to the EPS motor 23 becomes equal to the target converging assist torque Tas.

By virtue of the control of drive of the EPS motor 23, the motor 23 generates an assist torque Ta or reaction torque Tz which is coincident with the target converging assist torque Tas, and the generated assist torque Ta or reaction torque Tz is transmitted to the steering wheel 11. As a result, even in the case where the steering wheel 11 has overshot, it is possible to prevent mutual coupling between the vibration of the steering wheel 11 in the rotating direction and the vibration of the yawing generated in the vehicle. That is, it is possible to effectively converge the vibration of the steering wheel 11 in the rotating direction and to effectively converge the vibration of the yawing generated in the vehicle.

Incidentally, when the steering ECU 36 is executing the coupling compensation control as described above in a state in which the driver has activated the behavior control apparatus 40 and the LKA apparatus 50, in some cases there may simultaneously arise a request for providing the assist torque Ta for the rotating operation of the steering wheel 11 and a request for providing the reaction torque Tz for the rotating operation of the steering wheel 11. This will now be described specifically. Here, there is assumed a case where the steering ECU 36 is executing the coupling compensation control and is providing the assist torque Ta corresponding to the target converging assist torque Tas for the rotating operation of the steering wheel 11 by the driver.

In such a case, if the driver attempts to brake the vehicle which is traveling on a road on which the left and right wheels of the vehicle have different friction coefficients against the road surface; i.e., on a split μ road, the left and right wheels produce different braking forces due to a difference in friction coefficient therebetween, whereby a yaw rate γ is generated in the vehicle. Therefore, in order to cancel the generated yaw rate γ, the electronic control unit 41 of the behavior control apparatus 40 may calculate the reaction torque Tz_K to be provided for the rotating operation of the steering wheel 11, and request the steering ECU 36 to output the calculated reaction torque Tz_K. Further, if the vehicle has moved from the center of a lane and approached an edge of the lane in the state in which the yaw rate γ has been generated, in order to assist the driver in rotating the steering wheel 11, the electronic control unit 51 of the LKA apparatus 50 may calculate the reaction torque Tz_L to be provided for the rotating operation of the steering wheel 11, and request the steering ECU 36 to output the calculated reaction torque Tz_L.

Next, there is assumed a case where, on the contrary, the steering ECU 36 is executing the coupling compensation control, and is providing the reaction torque Tz corresponding to the target converging assist torque Tas for the driver's rotating operation of the steering wheel 11. In such a case, if a yaw rate γ is generated in the vehicle as a result of the driver attempting to brake the vehicle traveling on a split μ road, in order to cancel the generated yaw rate γ, the electronic control unit 41 of the behavior control apparatus 40 may calculate the assist torque Ta_K to be provided for the rotating operation of the steering wheel 11, and request the steering ECU 36 to output the calculated assist torque Ta_K. Further, if the vehicle has moved from the center of a lane and approached an edge of the lane in the state in which the yaw rate γ has been generated, in order to assist the driver in rotating the steering wheel 11, the electronic control unit 51 of the LKA apparatus 50 may calculate the assist torque Ta_L to be provided for the rotating operation of the steering wheel 11, and request the steering ECU 36 to output the calculated assist torque Ta_L.

Figure 5:
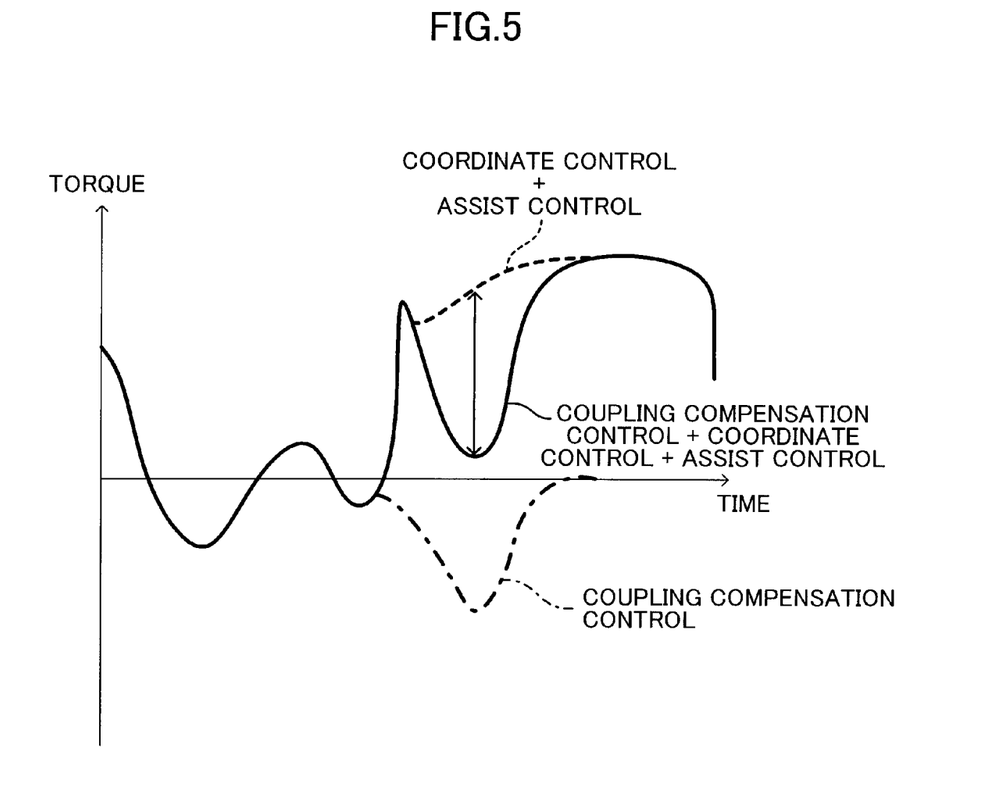
FIG. 5 is an explanatory diagram showing change in torque in the case where conflicting torques are provided simultaneously.

That is, in the case where the steering ECU 36 is executing the coupling compensation control, the behavior control apparatus 40 is executing the coordinate control, and simultaneously the LKA apparatus 50 is executing the assist control, there may arise a state in which the steering ECU 36 attempts to provide, for the rotating operation of the steering wheel 11, the assist torque Ta and the reaction torque Tz, which conflict (interfere) with each other. When the assist torque Ta and the reaction torque Tz, which conflict with each other, are provided simultaneously, as schematically shown in FIG. 5, for example, the assist torque Ta or the reaction torque Tz requested by the behavior control apparatus 40 and the LKA apparatus 50 decreases, whereby the effect of properly maintaining the traveling behavior of the vehicle may diminish.

Meanwhile, in such a case, if the state in which the steering ECU 36 provides a torque corresponding to the target converging assist torque Tas for the rotating operation of the steering wheel 11 under the coupling compensation control is instantaneously switched to the state in which the torque requested by the electronic control unit 41, 51 is provided, the driver senses a change in torque associated with the switching via the steering wheel 11, whereby the driver feels an unnatural sensation. Further, if the target converging assist torque Tas is decreased with elapse of time and the torque requested by the electronic control unit 41, 51 is increased with elapse of time so as to suppress the unnatural sensation stemming from the change in torque, a time delay occurs in the switching of torque to be provided for the rotating operation of the steering wheel 11. In such a case, a torque cannot be provided for the rotating operation of the steering wheel 11 at a proper timing, and the effect of properly maintaining the traveling behavior of the vehicle may diminish.

Therefore, in the case where the steering ECU 36 receives a torque output request from the electronic control unit 41, 51 when the steering ECU 36 is outputting the converging assist torque Tas under the coupling compensation control, the steering ECU 36 executes arbitration processing. Next, this arbitration processing will be described with reference to a functional block diagram of FIG. 6, which represents functions realized in the steering ECU 36 by means of computer program processing.

Figure 6:
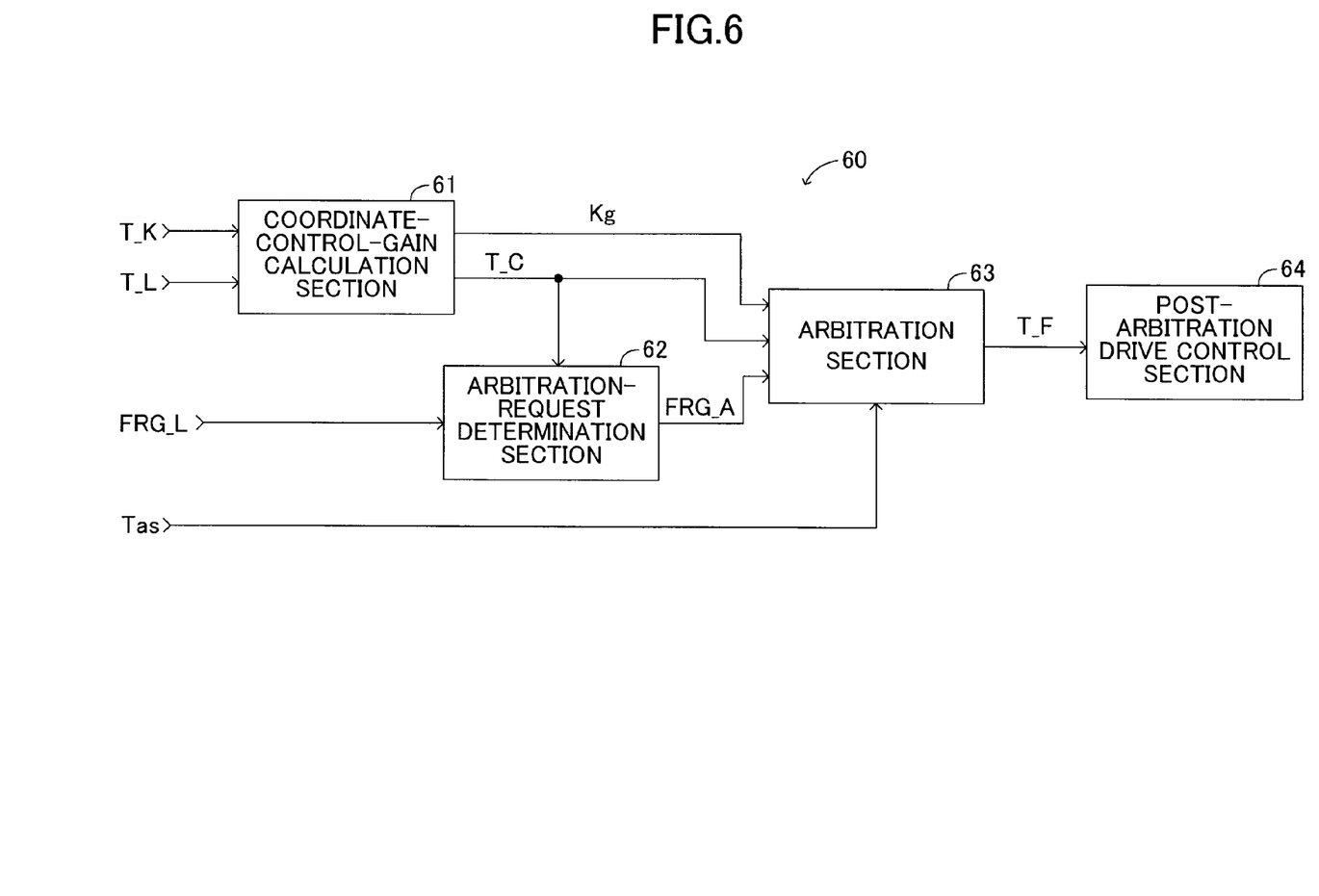
FIG. 6 is a functional block diagram functionally representing computer program processing (arbitration processing) executed by a steering ECU of FIG. 1.

The steering ECU 36 includes an arbitration processing section 60 which executes arbitration processing for quickly switching the torque provided for the rotating operation of the steering wheel 11 without providing an unnatural sensation to the driver. This arbitration processing section 60 is composed of a coordinate-control-gain calculation section 61, an arbitration-request determination section 62, an arbitration section 63, and a post-arbitration drive control section 64. Next, the coordinate-control-gain calculation section 61 will first be described.

The coordinate-control-gain calculation section 61 calculates a coordinate control gain Kg, which determines the magnitude of the target converging assist torque Tas associated with the arbitration processing, in accordance with the magnitudes of the coordinate control torque T_K output from the electronic control unit 41 of the behavior control apparatus 40 and the assist control torque T_L output from the electronic control unit 51 of the LKA apparatus 50. Notably, in the following description, the target converging assist torque Tas whose magnitude is changed in accordance with the coordinate control gain Kg under the arbitration processing will be referred to as a "coordinate-control arbitration torque Tr."

Figure 7:
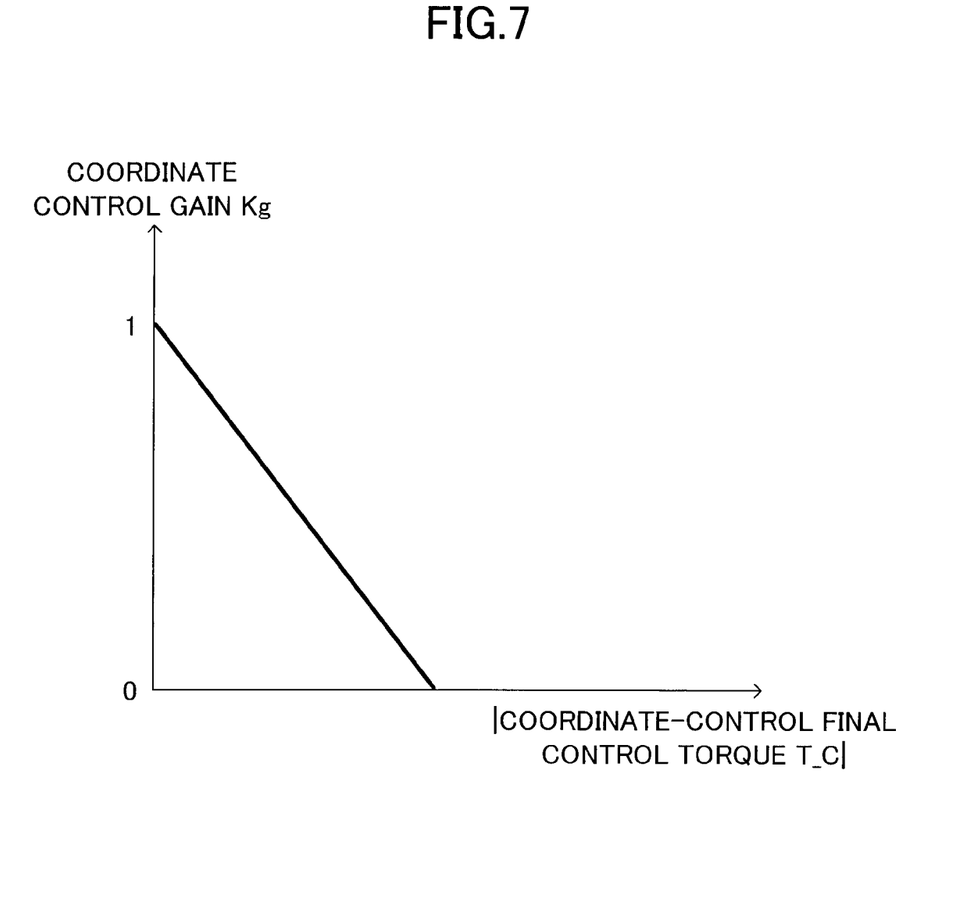
FIG. 7 is a graph showing the relation between coordinate-control final control torque T_C and coordinate control gain Kg.

Specifically, the coordinate-control-gain calculation section 61 receives the coordinate control torque T_K and the assist control torque T_L. The coordinate-control-gain calculation section 61 then calculates a coordinate-control final control torque T_C by adding the coordinate control torque T_K and the assist control torque T_L together. Subsequently, the coordinate-control-gain calculation section 61 refers to a gain map shown in FIG. 7 while using the absolute value of the calculated coordinate-control final control torque T_C, to thereby determine the coordinate control gain Kg. As is apparent from FIG. 7, the coordinate control gain Kg changes from "1" to "0" as the absolute value of the coordinate-control final control torque T_C increases. The coordinate-control-gain calculation section 61 then supplies the calculated coordinate-control final control torque T_C to the arbitration-request determination section 62 and the arbitration section 63, and supplies the determined coordinate control gain Kg to the arbitration section 63.

The arbitration-request determination section 62 determines whether or not arbitration is required, based on whether or not the electronic control unit 41 of the behavior control apparatus 40 issues a request for outputting the coordinate control torque T_K and whether or not the electronic control unit 51 of the LKA apparatus 50 issues a request for outputting the assist control torque T_L; and changes an arbitration request flag FRG_A which represents whether or not the output of the coordinate-control arbitration torque Tr is to be permitted or prohibited. In the following description, the coordinate control executed by the electronic control unit 41 of the behavior control apparatus 40 and the assist control executed by the electronic control unit 51 of the LKA apparatus 50 will be collectively referred to as "coordinate assist control." Permitting the output of the coordinate-control arbitration torque Tr means switching from the state in which a torque is provided for the rotating operation of the steering wheel 11 by means of the coordinate assist control to the state in which a torque is provided for the rotating operation of the steering wheel 11 by means of the coupling compensation control. Meanwhile, prohibiting the output of the coordinate-control arbitration torque Tr means switching from the state in which a torque is provided for the rotating operation of the steering wheel 11 by means of the coupling compensation control to the state in which a torque is provided for the rotating operation of the steering wheel 11 by means of the coordinate assist control.

The arbitration-request determination section 62 receives the steering assist request flag FRG_L from the electronic control unit 51 of the LKA apparatus 50 and the coordinate-control final control torque T_C from the coordinate-control-gain calculation section 61. The arbitration-request determination section 62 then determines whether or not conditions are satisfied; i.e., whether or not the steering assist request flag FRG_L is set to "0" representing that the steering assist is not requested and the absolute value of the coordinate-control final control torque T_C is smaller than the value of a previously set arbitration-request determination torque To. Notably, the value of the arbitration-request determination torque To is previously set to a small value such that the driver is less likely to sense a change in torque via the steering wheel 11.

Specifically, when the steering assist request flag FRG_L is set to "0" and the absolute value of the coordinate-control final control torque T_C is smaller than the arbitration-request determination torque To, the above-described conditions are satisfied. Therefore, the arbitration-request determination section 62 determines that arbitration is unnecessary. In this case, the arbitration-request determination section 62 sets the value of the arbitration request flag FRG_A to "0" representing that arbitration is unnecessary. The arbitration-request determination section 62 supplies to the arbitration section 63 the arbitration request flag FRG_A set to "0."

Meanwhile, when the steering assist request flag FRG_L is set to "1" representing that steering assist is necessary, or the absolute value of the coordinate-control final control torque T_C is greater than the arbitration-request determination torque To, the above-described conditions are not satisfied. Therefore, the arbitration-request determination section 62 determines that arbitration is necessary. In this case, the arbitration-request determination section 62 sets the value of the arbitration request flag FRG_A to "1" representing that arbitration is necessary. The arbitration-request determination section 62 then supplies to the arbitration section 63 the arbitration request flag FRG_A set to "1."

The arbitration section 63 determines the set value of the arbitration request flag FRG_A supplied from the arbitration-request determination section 62 and the magnitude of the coordinate-control arbitration torque Tr, and permits or prohibits the output of the coordinate-control arbitration torque Tr. For such control, the arbitration section 63 first calculates the coordinate-control arbitration torque Tr in accordance with the following Eq. 8; i.e., by multiplying the coordinate control gain Kg supplied from the coordinate-control-gain calculation section 61 and the target converging assist torque Tas together.

$$Tr = Kg \cdot Tas \qquad \text{Eq. 8}$$

Subsequently, the arbitration section 63 determines whether or not the following condition (1) or the following condition (2) is satisfied. That is, the condition (1) is a condition for switching from the state in which a torque is provided for the rotating operation of the steering wheel 11 by means of the coupling compensation control to the state in which a torque is provided for the rotating operation of the steering wheel 11 by means of the coordinate assist control; and the condition (2) is a condition for switching from the state in which a torque is provided for the rotating operation of the steering wheel 11 by means of the coordinate assist control to the state in which a torque is provided for the rotating operation of the steering wheel 11 by means of the coupling compensation control.

More specifically, the condition (1) is such that the set value of the arbitration request flag FRG_A is "1" (that is, arbitration is necessary), and the absolute value of the calculated coordinate-control arbitration torque Tr is smaller than the previously set state-change determination torque Ts. Further, the condition (2) is such that the set value of the arbitration request flag FRG_A is "0" (that is, arbitration is unnecessary), and the absolute value of the calculated coordinate-control arbitration torque Tr is smaller than the previously set state-change determination torque Ts. Since the conditions (1) and (2) each include the additional condition that the absolute value of the calculated coordinate-control arbitration torque Tr is smaller than the previously set state-change determination torque Ts, the torque provided for the rotating operation of the steering wheel 11 can be prevented from abruptly changing due to a state change. Accordingly, the value of the state-change determination torque Ts is previously set to a small value such that the driver hardly senses a change in torque via the steering wheel 11.

First, the determination as to whether or not the condition (1) is satisfied will be described. As described above, the coordinate-control arbitration torque Tr is calculated by multiplying the coordinate control gain Kg and the target converging assist torque Tas together. Since the coordinate control gain Kg quickly changes from "1" to "0" as the absolute value of the coordinate-control final control torque T_C increases, the coordinate-control arbitration torque Tr changes to "0" as the absolute value of the coordinate-control final control torque T_C increases.

Therefore, the arbitration section 63 determines that the condition (1) is not satisfied if the set value of the arbitration request flag FRG_A supplied from the arbitration-request determination section 62 is "1" and the absolute value of the coordinate-control arbitration torque Tr is greater than the state-change determination torque Ts; i.e., the absolute value of the coordinate-control final control torque T_C is still small. In this case, the arbitration section 63 permits the output of the coordinate-control arbitration torque Tr, and determines to use the coordinate-control arbitration torque Tr as the post-arbitration control torque T_F, which is provided for the rotating operation of the steering wheel 11 under the arbitration processing. That is, in this case, the arbitration section 63 maintains a state in which a torque is provided for the rotating operation of the steering wheel 11 by means of the coupling compensation control.

Meanwhile, the coordinate-control arbitration torque Tr quickly changes to "0" as the absolute value of the coordinate-control final control torque T_C increases. Therefore, even in the case where the condition (1) is not satisfied, when the set value of the arbitration request flag FRG_A is "1," the absolute value of the coordinate-control final control torque T_C quickly increases, and the absolute value of the coordinate-control arbitration torque Tr quickly becomes smaller than the value of the state-change determination torque Ts, whereby the condition (1) is quickly satisfied. When the arbitration section 63 determines that the condition (1) is satisfied, the arbitration section 63 prohibits the output of the coordinate-control arbitration torque Tr, and determines to use the coordinate-control final control torque T_C as the post-arbitration control torque T_F, which is provided for the rotating operation of the steering wheel 11 under the arbitration processing. In other words, in this case, the arbitration section 63 effects switching from the state in which a torque is provided for the rotating operation of the steering wheel 11 by means of the coupling compensation control to a state in which a torque is provided for the rotating operation of the steering wheel 11 by means of the coordinate assist control.

Next, the determination as to whether or not the condition (2) is satisfied will be described. When the coordinate assist control performed by the electronic control unit 41 of the behavior control apparatus 40 and the electronic control unit 51 of the LKA apparatus 50 ends, the arbitration request flag FRG_A whose value is set to "0" is supplied from the arbitration-request determination section 62 to the arbitration section 63. On the basis of the value of the arbitration request flag FRG_A, the arbitration section 63 determines whether or not the condition (2) is satisfied. That is, when the set value of the arbitration request flag FRG_A is "0" and the absolute value of the coordinate-control arbitration torque Tr is smaller than the state-change determination torque Ts, the arbitration section 63 determines that the condition (2) is satisfied.

Notably, as described above, the value of the arbitration request flag FRG_A is set to "0" by the arbitration-request determination section 62 when the value of the steering assist request flag FRG_L is set to "0" and the absolute value of the coordinate-control final control torque T_C is smaller than the value of the arbitration-request determination torque To. Meanwhile, the coordinate-control arbitration torque Tr is calculated by multiplying the target converging assist torque Tas by the coordinate control gain Kg determined to correspond to the coordinate-control final control torque T_C whose absolute value is smaller than the value of the arbitration-request determination torque To.

Therefore, the arbitration section 63 permits the output of the coordinate-control arbitration torque Tr when the absolute value of the coordinate-control arbitration torque Tr—which increases in accordance with the coordinate control gain Kg (which increases as the absolute value of the coordinate-control final control torque T_C decreases); that is, which increases as the absolute value of the coordinate-control final control torque T_C decreases—is smaller than the state-change determination torque Ts. In other words, the arbitration section 63 quickly effects switching from the state in which a torque is provided for the rotating operation of the steering wheel 11 by means of the coordinate assist control to the state in which a torque is provided for the rotating operation of the steering wheel 11 by means of the coupling compensation control. When the condition (2) is satisfied, the arbitration section 63 determines to use the coordinate-control arbitration torque Tr as the post-arbitration control torque T_F, which is provided for the rotating operation of the steering wheel 11 under the arbitration processing.

Notably, the following is the reason why, in spite of completion of the coordinate assist control, the arbitration section 63 determines to use the coordinate-control arbitration torque Tr as the post-control torque T_F when the condition (2) is satisfied. That is, as described above, the condition (2) is satisfied when the absolute value of the coordinate-control final control torque T_C is smaller than the arbitration-request determination torque To. However, in some cases, the absolute value of the coordinate-control final control torque T_C is not zero even when the condition (2) has been satisfied. Therefore, until the absolute value of the coordinate-control final control torque T_C becomes "0," the arbitration section 63 uses, as the post-arbitration control torque T_F, the coordinate-control arbitration torque Tr obtained by multiplying the target converging assist torque Tas by the coordinate control gain Kg.

Meanwhile, the arbitration section 63 determines that the condition (2) is not satisfied when the set value of the arbitration request flag FRG_A supplied from the arbitration-request determination section 62 is "0" and, for example, the absolute value of the coordinate-control final control torque T_C becomes small sharply, so that the absolute value of the coordinate-control arbitration torque Tr is greater than the state-change determination torque Ts. In this case, the arbitration section 63 continuously prohibits the output of the coordinate-control arbitration torque Tr, and determines to use the coordinate-control final control torque T_C as the post-arbitration control torque T_F, which is provided for the rotating operation of the steering wheel 11 under the arbitration processing. Notably, in this case, after the absolute value of the coordinate-control final control torque T_C becomes "0," the arbitration section 63 determines to use the coordinate-control arbitration torque Tr as the post-arbitration control torque T_F.

After having determined the post-arbitration control torque T_F by means of the arbitration processing, the arbitration section 63 supplies the determined post-arbitration control torque T_F to the post-arbitration drive control section 64. The post-arbitration drive control section 64 calculates a drive current corresponding to the supplied post-arbitration control torque T_F on the basis of a previously set relation (specifically, by reference to a previously set map). The post-arbitration drive control section 64 then supplies the calculated drive current to the EPS motor 23 via the drive circuit 37. At that time, the post-arbitration drive control section 64 receives from the current detector 37a the signal representing the drive current flowing to the EPS motor 23, and feedback-controls the drive circuit 37 such that a drive current whose magnitude corresponds to the post-arbitration control torque T_F properly flows to the EPS motor 23. By virtue of the control of drive of the EPS motor 23, the motor 23 generates an assist torque Ta or a reaction torque Tz which coincides with the post-arbitration control torque T_F, and the generated assist torque Ta or reaction torque Tz is transmitted to the steering wheel 11.

As can be understood from the above description as well, according to the present embodiment, even in the case where there simultaneously occur a state in which the assist torque Ta or the reaction torque Tz, which serves as the first force, is provided for the rotating operation of the steering wheel 11 so as to correct the traveling behavior of the vehicle on the basis of the coordinate-control final control torque T_C (the first controlled variable) output from the behavior control apparatus 40 and the LKA apparatus 50 and a state in which the assist torque Ta or the reaction torque Tz, which serves as the second force, is provided for the rotating operation of the steering wheel 11 on the basis of the calculated target converging assist torque Tas (the second controlled variable), the arbitration processing section 60 can prevent these torques from interfering with each other.

Specifically, the coordinate-control-gain calculation section 61 calculates the coordinate control gain Kg, which decreases as the magnitude (absolute value) of the coordinate-control final control torque T_C increases, and increases as the magnitude (absolute value) of the coordinate-control final control torque T_C decreases. Subsequently, the arbitration section 63 calculates the coordinate-control arbitration torque Tr by multiplying the target converging assist torque Tas by the coordinate control gain Kg. Thus, the magnitude of the target converging assist torque Tas changes in accordance with the coordinate control gain Kg; i.e., the magnitude (absolute value) of the coordinate-control arbitration torque Tr can be changed quickly as the magnitude (absolute value) of the coordinate-control final control torque T_C changes.

Therefore, in a state in which the magnitude (absolute value) of the coordinate-control final control torque T_C increases, due to the decreasing coordinate control gain Kg, the magnitude (absolute value) of the coordinate-control arbitration torque Tr can be decreased quickly. Thus, the assist torque Ta or the reaction torque Tz based on the coordinate-control final control torque T_C can be preferentially provided for the rotating operation of the steering wheel 11. Meanwhile, in a state in which the magnitude (absolute value) of the coordinate-control final control torque T_C decreases, due to the increasing coordinate control gain Kg, the magnitude (absolute value) of the coordinate-control arbitration torque Tr can be increased quickly. Thus, the assist torque Ta or the reaction torque Tz based on the coordinate-control arbitration torque Tr can be preferentially provided for the rotating operation of the steering wheel 11. Accordingly, by means of making a change in the magnitude (absolute value) of the coordinate-control arbitration torque Tr match a change in the magnitude of the coordinate-control final control torque T_C, the torque provided for the rotating operation of the steering wheel 11 can be switched quickly without any time delay.

Further, in this case, by means of taking notice of the magnitude (absolute value) of the coordinate-control arbitration torque Tr and the trend of change in the magnitude thereof (decreasing trend or increasing trend), it becomes possible to prohibit or permit the output of the coordinate-control arbitration torque Tr; that is, to permit or prohibit the output of the coordinate-control final control torque T_C when the magnitude of the coordinate-control arbitration torque Tr is smaller than the state-change determination torque Ts. By virtue of this control, the driver becomes less likely to sense an unnatural sensation via the steering wheel 11 due to a change in the torque, which change occurs upon switching from the state in which the coordinate-control arbitration torque Tr is output to the state in which the coordinate-control final control torque T_C is output, or upon switching from the state in which the coordinate-control final control torque T_C is output to the state in which the coordinate-control arbitration torque Tr is output.

Further, in the case where the magnitude (absolute value) of the coordinate-control final control torque T_C is greater than the arbitration-request determination torque To; i.e., in the case where the assist torque Ta or the reaction torque Tz based on the coordinate-control final control torque T_C must be provided for the rotating operation of the steering wheel 11 in order to correct the traveling behavior of the vehicle, the arbitration-request determination section 62 can determine the necessity for arbitration for giving priority to the output of the coordinate-control final control torque T_C over the output of the coordinate-control arbitration torque Tr in order to effectively prevent interference between the coordinate-control final control torque T_C and the coordinate-control arbitration torque Tr. In the case where the arbitration section 63 receives the arbitration request flag FRG_A set to "1", which indicates that arbitration is necessary when the magnitude of the coordinate-control arbitration torque Tr is smaller than the state-change determination torque Ts, the arbitration section 63 can permit the output of the coordinate-control final control torque T_C instead of the output of the coordinate-control arbitration torque Tr. Meanwhile, when the arbitration section 63 receives the arbitration request flag FRG_A set to "0," the arbitration section 63 can permit the output of the coordinate-control arbitration torque Tr instead of the output of the coordinate-control final control torque T_C. By virtue of this operation, the arbitration processing section 60 can preferentially output the coordinate-control final control torque T_C while reliably preventing interference between the coordinate-control final control torque T_C and the coordinate-control arbitration torque Tr.

In this case, the steering assist request flag FRG_L set to "1" so as to request the output of the coordinate-control final control torque T_C is output along with the coordinate-control final control torque T_C. Therefore, the necessity of arbitration can be determined by use of this steering assist request flag FRG_L as well. As described above, through use of the steering assist request flag FRG_L, the arbitration processing section 60 can preferentially output the coordinate-control final control torque T_C while more reliably preventing interference between the coordinate-control final control torque T_C and the coordinate-control arbitration torque Tr.

The present invention is not limited to the above-described embodiment, and various modifications are possible without departing from the scope of the present invention.

For example, in the above-described embodiment, the arbitration processing section 60 includes the arbitration-request determination section 62. The arbitration-request determination section 62 determines whether or not arbitration is necessary, based on whether or not the electronic control unit 41 of the behavior control apparatus 40 requests the output of the coordinate control torque T_K and whether or not the electronic control unit 51 of the LKA apparatus 50 requests the output of the assist control torque T_L, and changes the arbitration request flag FRG_A which represents whether the output of the coordinate-control arbitration torque Tr is to be permitted or prohibited. The arbitration section 63 permits or prohibits the output of the coordinate-control arbitration torque Tr on the basis of the arbitration request flag FRG_A supplied from the arbitration-request determination section 62.

However, as described above, the coordinate-control arbitration torque Tr is obtained by multiplying the target converging assist torque Tas by the coordinate control gain Kg, and the coordinate control gain Kg is set to a value within the range of 0 to 1 in accordance with a change (increase or decrease) of the coordinate-control final control torque T_C. Therefore, when the coordinate-control final control torque T_C increases, the coordinate-control arbitration torque Tr decreases; and, when the coordinate-control final control torque T_C decreases, the coordinate-control arbitration torque Tr increase. Accordingly, the arbitration-request determination section 62 can be omitted; in other words, the arbitration section 63 may be configured not to determine the set value of the arbitration request flag FRG_A.

That is, in the case where the coordinate-control arbitration torque Tr is decreasing; i.e., the absolute value of the coordinate-control final control torque T_C is increasing, the arbitration section 63 prohibits the output of the coordinate-control arbitration torque Tr when the absolute value of the coordinate-control arbitration torque Tr is smaller than the state-change determination torque Ts. Meanwhile, in the case where the coordinate-control arbitration torque Tr is increasing; i.e., the absolute value of the coordinate-control final control torque T_C is decreasing, the arbitration section 63 permits the output of the coordinate-control arbitration torque Tr when the absolute value of the coordinate-control arbitration torque Tr is smaller than the state-change determination torque Ts. By virtue of this operation, the effects similar to those of the above-described embodiment can be expected.

In the above-described embodiment, there has been described the case where both the behavior control apparatus 40 and the LKA apparatus 50 operate. However, the present invention can be applied to the case where only one of the apparatuses 40 and 50 operates. Even in the case where only one of the apparatuses 40 and 50 operates, effects similar to those of the above-described embodiment can be expected so long as the arbitration processing section 60 executes the arbitration processing in the same manner. Notably, in this case, the arbitration-request determination section 62 can omit the operation of determining the value of the steering assist request flag FRG_L when only the behavior control apparatus 40 operates.

Further, in the above-described embodiment, the arbitration processing section 60 arbitrates between the case where a torque is provided for the rotating operation of the steering wheel 11 by means of the coupling compensation control and the case where a torque is provided for the rotating operation of the steering wheel 11 by means of the coordinate assist control, and uses the coordinate-control arbitration torque Tr or the coordinate-control final control torque T_C as the post-arbitration control torque T_F. The embodiment may be modified such that the arbitration processing section 60 arbitrates between the case where a torque is provided for the rotating operation of the steering wheel 11 by means of the above-described normal control rather than the coupling compensation control and the case where a torque is provided for the rotating operation of the steering wheel 11 by means of the coordinate assist control, and uses the coordinate-control arbitration torque Tr or the coordinate-control final control torque T_C as the post-arbitration control torque T_F.

Further, in the above-described embodiment, the present invention is applied to an electric power steering apparatus designed such that the steering wheel 11 is connected directly to the steering gear unit 20 by means of the steering shaft 12. However, the present invention can be applied to an electric power steering apparatus which includes a variable gear mechanism which can change the relation between displacement of the steering wheel 11 in the rotational direction and displacement of the rack bar 22 in the axial direction. Notably, since the structure and operation of such a variable gear mechanism are well known, their detailed descriptions will not be provided here.

Such an electric power steering apparatus differs from the electric power steering apparatus of the above-described embodiment in that the steering shaft 12 is composed of a steering input shaft which can rotate together with the steering wheel 11, and a steering output shaft connected to the steering gear unit 20. The variable gear mechanism connects the steering input shaft and the steering output shaft with each other, and changes the relation between the amount of rotation of the steering input shaft and the amount of rotation of the steering output shaft.

Even in such an electric power steering apparatus having the above-described configuration, in some cases, a request for providing the assist torque Ta for the rotating operation of the steering wheel 11 and a request for providing the reaction torque Tz for the rotating operation of the steering wheel 11 occur simultaneously in a state in which the coupling compensation control and the coordinate assist control are being executed simultaneously. In such a case, the arbitration processing section 60 executes the arbitration processing in the same manner as in the above-described embodiment. Therefore, the torque provided for the rotating operation of the steering wheel 11 can be switched quickly without imparting unnatural sensation to the driver, whereby effects similar to those of the above-described embodiment can be expected.

The invention claimed is:

1. A steering control apparatus for a vehicle comprising a steering wheel operated by a driver, a force providing unit that provides a predetermined force for the operation of the steering wheel, and an operation control unit that controls the operation of the force providing unit, the operation control unit comprises:
   a first-controlled-variable input unit that inputs a first controlled variable output from an apparatus which controls a traveling behavior of the vehicle, the first controlled variable being used to provide a first force for the operation of the steering wheel so as to correct the traveling behavior of the vehicle;
   a second-controlled-variable calculation unit that calculates a second controlled variable used to provide a second force for the operation of the steering wheel so as to reduce an operating force applied to the steering wheel by the driver or resist against the operating force;

a gain calculation unit that calculates a gain which decreases as the first controlled variable input by the first-controlled-variable input unit increases and increases as the input first controlled variable decreases, the gain changing the magnitude of the second controlled variable calculated by the second-controlled-variable calculation unit;

an arbitration unit that prohibits output of the second controlled variable changed in accordance with the gain and permitting output of the first controlled variable when the magnitude of the second controlled variable which is decreasing in accordance with the gain calculated by the gain calculation unit becomes smaller than a preset predetermined permission value, and permits the output of the second controlled variable changed in accordance with the gain and prohibiting the output of the first controlled variable when the magnitude of the second controlled variable which is increasing in accordance with the gain is smaller than the predetermined permission value; and an operation unit that operates the force providing unit by use of the first controlled variable or the second controlled variable changed in accordance with the gain, the output of which is permitted by the arbitration unit.

2. The steering control apparatus for a vehicle according to claim 1, wherein the magnitude of the second controlled variable is changed by being multiplied by the gain calculated by the gain calculation unit.

3. The steering control apparatus for a vehicle according to claim 1, wherein the operation control unit further comprises an arbitration determination unit that compares the magnitude of the first controlled variable input by the first-controlled-variable input unit and a preset predetermined determination value, and determines that arbitration for giving priority to the output of the first controlled variable over the output of the second controlled variable changed in accordance with the calculated gain is necessary when the magnitude of the first controlled variable is greater than the predetermined determination value; and the arbitration unit prohibits the output of the second controlled variable changed in accordance with the gain and permits the output of the first controlled variable when the arbitration determination unit determines that the arbitration is necessary and the magnitude of the second controlled variable which is decreasing in accordance with the gain is smaller than a preset predetermined permission value, and the arbitration unit permits the output of the second controlled variable changed in accordance with the gain and prohibits the output of the first controlled variable when the arbitration determination unit determines that the arbitration is unnecessary and the magnitude of the second controlled variable which is increasing in accordance with the gain is smaller than the permission value.

4. The steering control apparatus for a vehicle according to claim 3, wherein the apparatus for controlling the traveling behavior of the vehicle outputs the first controlled variable and a request information piece which requests the output of the first controlled variable; and the arbitration determination unit determines that arbitration for giving priority to the output of the first controlled variable over the output of the second controlled variable changed in accordance with the gain is necessary when the magnitude of the first controlled variable input by the first-controlled-variable input unit is greater than the predetermined determination value or when the request information piece is input by the first-controlled-variable input unit.

5. The steering control apparatus for a vehicle according to claim 1, wherein the apparatus for controlling the traveling behavior of the vehicle is at least one of a behavior control apparatus which corrects a disorder of behavior generated as a result of braking or driving the vehicle to thereby stabilize the traveling posture of the vehicle and a lane-keeping assist apparatus which assists the operation of the steering wheel by the driver in order to cause the vehicle to travel while following the shape of a portion of a road located ahead of the vehicle.

6. The steering control apparatus for a vehicle according to claim 5, wherein the first controlled variable is the sum of a controlled variable which is output from the behavior control apparatus and is used to provide a force for the operation of the steering wheel in order to correct the disorder of behavior generated in the vehicle, and a controlled variable which is output from the lane-keeping assist apparatus and is used to provide a force for the operation of the steering wheel in order to assist the operation of the steering wheel.

7. The steering control apparatus for a vehicle according to claim 1, wherein the second-controlled-variable calculation unit calculates a second controlled variable used to provide the second force for the operation of the steering wheel in order to prevent a vibration of the steering wheel in the operation direction and a vibration of yawing generated in the vehicle from becoming antiphase with each other and resonating.

8. The steering control apparatus for a vehicle according to claim 7, wherein the second-controlled-variable calculation unit calculates a second controlled variable used to provide the second force for the operation of the steering wheel in order to reduce a phase difference between a change in the operation amount of the steering wheel and a change in the operating force applied to the steering wheel.

* * * * *